UNITED STATES PATENT OFFICE.

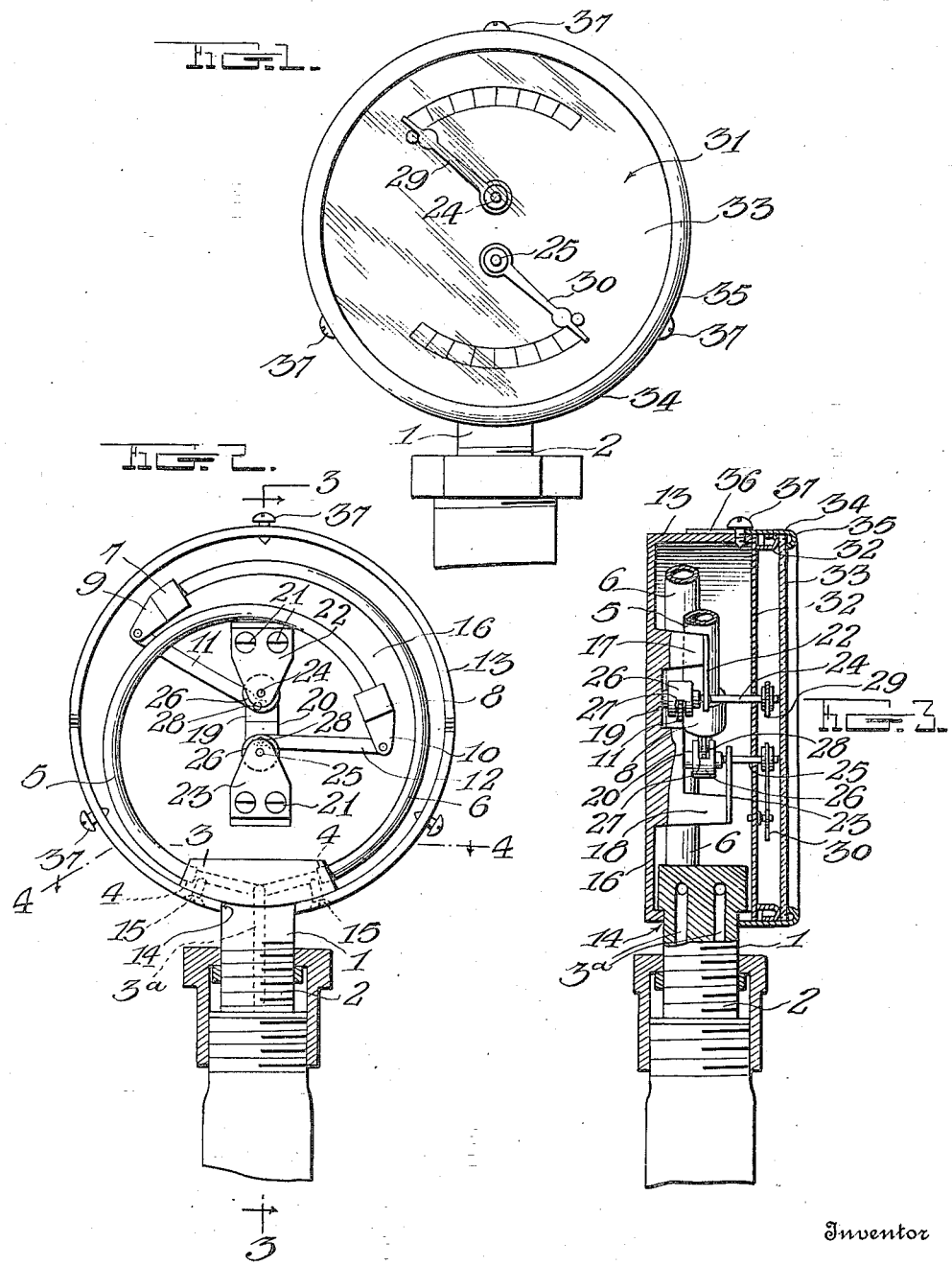

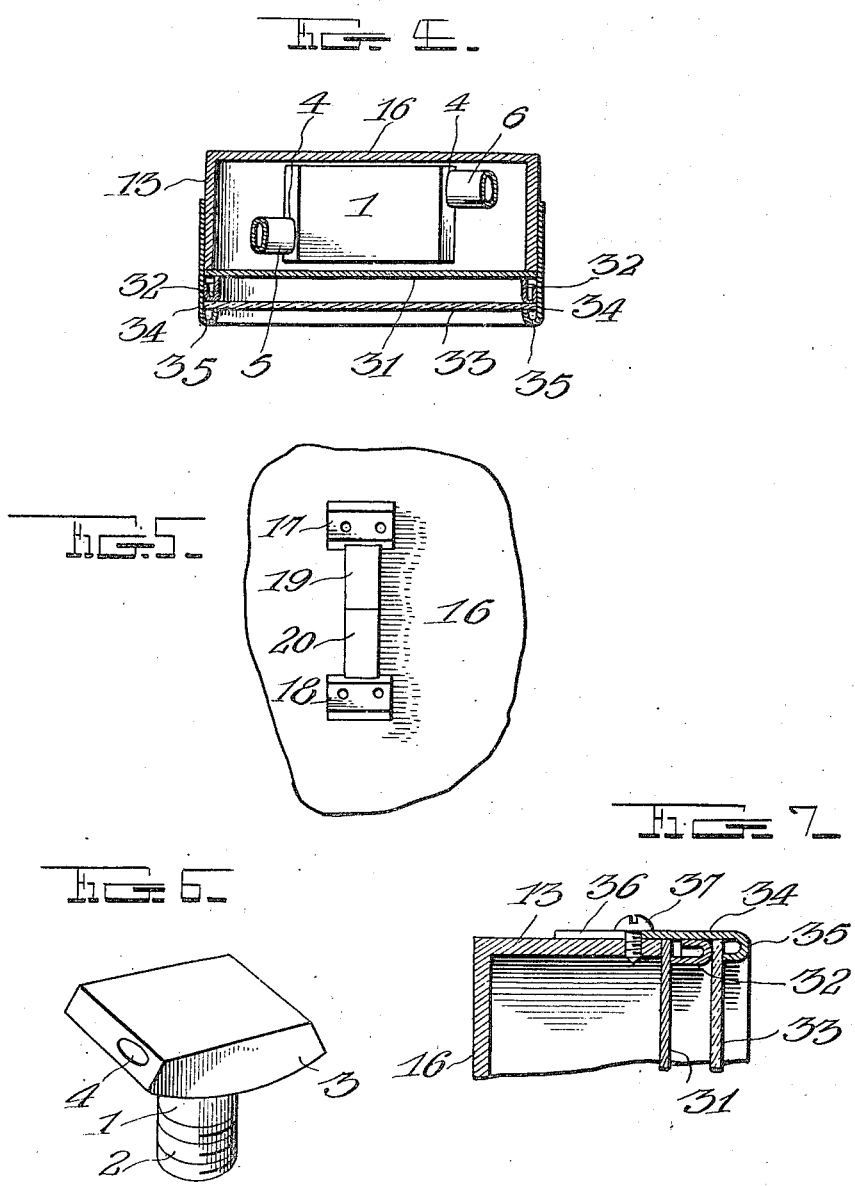

JOHN C. DUNCAN, OF BENTON, ILLINOIS.

PRESSURE-GAGE.

1,127,745.

Specification of Letters Patent.

Patented Feb. 9, 1915.

Application filed June 8, 1914. Serial No. 843,868.

*To all whom it may concern:*

Be it known that I, JOHN C. DUNCAN, a citizen of the United States, residing at Benton, in the county of Franklin and State of Illinois, have invented certain new and useful Improvements in Pressure-Gages; and I do declare the following to be a full, clear, and exact description of the invention, such as will enable others skilled in the art to which it appertains to make and use the same.

My invention relates to improvements in pressure gages and more particularly to those which are designed to simultaneously register the amount of pressure from two independent containers.

The main object of the invention is to provide a device of this character which will be extremely simple and effective in construction, thereby readily adapting the device for use in connection with mine rescue apparatus.

Another object of the invention, in carrying out the above end, becomes to form a casing for the gage and the supporting bearings for a pair of shafts, to be described, of a single piece of metal, thereby simplifying the structure of these features.

A further object is to provide an extremely simple yet rigid support for a pair of expanding tubes.

Still another object is to provide means for securing the dial and transparent covering therefor, in place by a single clamping element.

With these objects in view, the invention resides in certain novel features of construction and combination herein described and claimed and shown in the drawings wherein:

Figure 1 is a front elevation of a pressure gage constructed in accordance with my invention; Fig. 2 is a similar view with parts removed and in section; Fig. 3 is a vertical transverse section through the entire device, taken upon the plane of the line 3—3 of Fig. 2; Fig. 4 is a horizontal section taken along the plane of line 4—4 of Fig. 1; Fig. 5 is a detailed plan view of a portion of the end wall of the casing, showing more particularly the arrangement of the bosses and shoulders thereon; Fig. 6 is a similar view of the supporting member of the gage, and Fig. 7 is an enlarged vertical section through the clamping ring, for securing the dial and transparent covering therefor, in position upon the gage.

In the accompanying drawings, I have shown my improved pressure gage as including a cylindrical supporting member 1 which is externally threaded on its lower end as indicated at 2 for the purpose of receiving a coupling whereby the device may be attached to a pair of feed pipes (not shown). The member 1 is provided with an enlarged head 3 which projects outwardly from its opposite sides as indicated at 3, said outwardly projecting portions having sockets 4 formed in their outer ends and lying in horizontally spaced planes. As most clearly seen in Fig. 2, the sockets 4 receive the lower ends of substantially semi-circular expanding tubes 5 and 6 whose free ends are closed by suitable caps 7 and 8, respectively, said caps being provided with ears 9 and 10 to which links 11 and 12 are pivoted, said links actuating a pair of indicating hands in a manner to appear.

As most clearly seen in Fig. 2, the head 2 is located within a cylindrical casing 13 which is provided, in its lower side, with an opening 14 which receives the cylindrical member 1. When in this position, screws 15 are passed through the annular wall of the casing 13 and into the extensions 3 of the head 2, thereby rigidly supporting said casing.

One end of the casing 13 is closed by an integral end plate 16 which is provided with upper and lower bosses 17 and 18 respectively, said bosses being of unequal lengths and being spaced vertically. As clearly seen in the vertical transverse section, the boss 17 is provided with a shoulder 19, formed integrally therewith and with the end wall 16, while the boss 18 is provided with a similar shoulder 20, said shoulders 19 and 20 being spaced equi-distantly from the ends of their respective bosses.

It is to be noted that the casing, the end wall thereof, the upper and lower bosses and their shoulders are formed in a single casting, this construction being extremely simple and rigid.

Projecting inwardly from the bosses 17 and 18 and secured to their outer ends by means of screws 21, are upper and lower bearing plates 22 and 23, said plates being located opposite to and lying parallel with the shoulders on their respective bosses. By this construction, supports are provided for upper and lower shafts 24 and 25 which are revolubly mounted in alined openings formed in the plates 22 and 23 and in the shoulders 19 and 20, coacting therewith. These shafts are formed integrally with the cylindrical blocks 26 which are located concentrically therewith and disposed between the coacting bearing plates and shoulders, said blocks 26 having notches 27 formed in one side for the reception of the free ends of the links 11 and 12, pivot pins 28 being passed through said free ends of said links and through the parallel walls of the notches 27.

By the above set forth construction, it will be seen that pressure, discharged from the sockets 3 into the expanding tubes 5 and 6, will straighten said tubes to a certain extent, thereby pulling upon the links 11 and 12 and thus turning the upper and lower shafts 24 and 25 to actuate a pair of indicating hands or fingers 29 and 30, said indicating fingers coacting with suitable scales formed on a dial 31 which forms a closure for the remaining end of casing 13. Contacting with the outer surface of the dial 31, near its outer edge, is a ring 32 which is substantially U shape in cross section, a circular glass panel 33 being held in contact with the outer side of said ring, by a ring shaped clamping member 34, the later having one end formed with an inwardly turned bead 35 which contacts with the panel 33 while its opposite end or edge is provided with a number of open slots 36 which straddle clamping screws 37 which extend outwardly from the casing 13, it being seen, by reference to Fig. 3, that the ring shaped member 34 receives said casing, when the parts are assembled.

By the above described fastening means for the dial 31 and the glass panel 33, it will be seen that the member 34 retains both of these elements in position and that the ring 32, being interposed between said dial and panel, forms ample space in which the indicators 29 and 30 may operate.

The invention, as above described, is designed primarily for indicating the amount of pressure within the oxygen and nitrogen tanks, used in connection with mine rescue apparatus, in which connection the gases are fed to the sockets 3 and thereby into the expanding tubes 5 and 6 by means of suitable ports 3ª which are formed through the cylindrical member 1 and have their upper ends extended laterally in opposite directions to register independently with said sockets.

From the foregoing description, taken in connection with the accompanying drawings, it will be seen that I have produced a duplex pressure gage of extremely simple construction yet one which will be efficient and absolutely positive in operation.

I have described my invention with considerable minuteness but I do not wish to be limited to minor details such as proportioning and arrangement of parts.

Having thus described my invention, what I claim as new and desire to secure by Letters Patent is:—

1. A pressure gage comprising a cylindrical casing having one end closed by an upright end plate, an upper and a lower boss formed on the inner side of said end plate and being of unequal length, shoulders formed integrally with the facing surfaces of said bosses and spaced equidistantly from their ends, bearing plates secured to said ends of the bosses and disposed opposite said shoulders, the plates and the shoulders having alined bearing openings, shafts revolubly mounted in said bearings, indicating means operable by said shafts and pressure operated means for rotating the latter.

2. A pressure gage comprising a comparatively flat cylindrical casing having an opening in its circular wall, a dial closing one end of said casing, a pair of shafts rotatably mounted in the casing and projecting through the dial, indicating hands on said shafts and coacting with the dial, a transversely elongated head in the casing and located adjacent the opening in the circular wall thereof, one side of said head being curved to conform to the curvature of said wall, and each end of said head having a rocket, a pair of arcuate expanding tubes within the casing and having their inner ends anchored in said sockets, connections between the outer ends of said tubes and said shafts for rotating the latter, a cylindrical extension formed integrally with the curved side of said head and projecting through said opening in the curved wall, and fastening screws passing through said curved wall and into said head, said cylindrical extension and said head having a pair of ports leading from the free end of the former and discharging into the sockets in the latter.

In testimony whereof I have hereunto set my hand in presence of two subscribing witnesses.

JOHN C. DUNCAN.

Witnesses:
J. LINDSAY OLIVER,
T. E. GAYESKI.